United States Patent
Mehta

(10) Patent No.: US 8,925,053 B1
(45) Date of Patent: Dec. 30, 2014

(54) INTERNET-ACCESSIBLE SERVICE FOR DYNAMIC AUTHENTICATION AND CONTINUOUS ASSERTION OF TRUST LEVEL IN IDENTITIES

(75) Inventor: Nirav Mehta, Shrewsbury, MA (US)

(73) Assignee: EMC Corporation, Hopkinton, MA (US)

( * ) Notice: Subject to any disclaimer, the term of this patent is extended or adjusted under 35 U.S.C. 154(b) by 385 days.

(21) Appl. No.: 13/472,999

(22) Filed: May 16, 2012

Related U.S. Application Data

(60) Provisional application No. 61/602,759, filed on Feb. 24, 2012.

(51) Int. Cl.
*G06F 21/00* (2013.01)
*H04L 9/32* (2006.01)

(52) U.S. Cl.
USPC ............... 726/6; 726/2; 726/3; 726/4; 726/5; 726/7; 713/155; 713/166

(58) Field of Classification Search
USPC .............................. 726/1–8, 27; 713/155, 166
See application file for complete search history.

(56) References Cited

U.S. PATENT DOCUMENTS

| | | | |
|---|---|---|---|
| 8,024,777 B2 | 9/2011 | Shull et al. | |
| 8,347,088 B2 | 1/2013 | Moore et al. | |
| 8,418,238 B2 | 4/2013 | Platt et al. | |
| 8,434,128 B2 | 4/2013 | Kennedy | |
| 2004/0083394 A1* | 4/2004 | Brebner et al. | 713/202 |
| 2012/0054847 A1* | 3/2012 | Schultz et al. | 726/9 |
| 2013/0047226 A1 | 2/2013 | Radhakrishnan et al. | |
| 2013/0055348 A1* | 2/2013 | Strauss et al. | 726/3 |

* cited by examiner

*Primary Examiner* — Andrew Nalven
*Assistant Examiner* — Amir Mehrmanesh
(74) *Attorney, Agent, or Firm* — BainwoodHuang

(57) ABSTRACT

An authentication technique involves receiving an authentication request which includes a set of authentication factors and performing, in response to the authentication request, an authentication operation based on a set of authentication factors. An authentication result of the authentication operation identifies a particular trust category among a set of trust categories. Each trust category of the set defines a unique set of user permissions. The technique further involves providing the authentication result for use by a web application. The particular trust category identified by the authentication result defines a particular set of user permissions to be imposed by the web application. For example, the trust categories may take the form of trust levels such as Low, Med, and High which control access to certain resources. Furthermore, the technique involves providing periodic and/or random authentication requests to the authentication server to detect hijacking of the user session after successful initial authentication.

20 Claims, 6 Drawing Sheets

| | RESOURCE A (E.G., READ ANY INFORMATION) | RESOURCE B (E.G., WRITE ANY INFORMATION) | RESOURCE C (E.G., ONLY TRANSACTIONS UNDER $100) | RESOURCE D (E.G., GREATER THAN OR EQUAL TO $100) | RESOURCE D (E.G., CHANGE USER SETTINGS) | |
|---|---|---|---|---|---|---|
| TRUST CATEGORY 50(1) | ACCESS PERMITTED | ACCESS PERMITTED | ACCESS PERMITTED | ACCESS PERMITTED | ACCESS DENIED | ... |
| TRUST CATEGORY 50(2) | ACCESS PERMITTED | ACCESS DENIED | ACCESS PERMITTED | ACCESS DENIED | ACCESS DENIED | ... |
| TRUST CATEGORY 50(3) | ACCESS DENIED | ACCESS DENIED | ACCESS PERMITTED | ACCESS PERMITTED | ACCESS DENIED | ... |
| TRUST CATEGORY 50(4) | ACCESS PERMITTED | ACCESS PERMITTED | ACCESS DENIED | ACCESS DENIED | ACCESS PERMITTED | ... |
| TRUST CATEGORY 50(5) | ACCESS DENIED | ACCESS DENIED | ACCESS DENIED | ACCESS DENIED | ACCESS PERMITTED | ... |

INTERNET-ACCESSIBLE SERVICE FOR DYNAMIC AUTHENTICATION AND CONTINUOUS ASSERTION OF TRUST LEVEL IN IDENTITIES

CROSS REFERENCE TO RELATED APPLICATIONS

This application claims the benefit under 35 U.S.C. §119 (e) of U.S. Provisional Application Ser. No. 61/602,759 entitled "INTERNET-ACCESSIBLE SERVICE FOR DYNAMIC AUTHENTICATION AND CONTINUOUS ASSERTION OF TRUST LEVEL IN IDENTITIES," filed on Feb. 24, 2012, the contents and teachings of which are hereby incorporated by reference in their entirety.

FIELD OF THE INVENTION

The subject matter of the present disclosure is related to the field of user authentication and continuous assertion of trust categories (or levels) in network-delivered services, such as web applications that provide access to resources in a secure manner.

BACKGROUND

Some web servers require a user of a client device to successfully authenticate before granting access to the user. For example, the user may be required to supply a one-time use passcode (OTP) from a hardware token that the user possesses in order to demonstrate that the user is legitimate (i.e., to show that the user is not an imposter due to possession of the hardware token). As another example, certain adaptive authentication factors about the user may be collected and assessed against previous behavior such as geo-location of the client device (or of the client device's ISP/network), time of day of the access attempt, and access frequency, to determine whether the user is legitimate. As yet another example, the user may be required to answer a knowledge-based authentication (KBA) question (i.e., correctly respond to a question that the real user should be able to answer).

During such authentication, an authentication server typically compares the current information obtained from the user's client device to expected information. If the information appropriately matches, authentication is successful. If the information does not appropriately match, authentication is considered unsuccessful.

When authentication is successful, the user is granted access on the web server. When authentication is unsuccessful, the user may be immediately provided with another opportunity to authenticate and, if authentication is still unsuccessful, the user is denied access on the web server.

SUMMARY

Unfortunately, there are deficiencies to the above-described conventional approaches to user authentication. For example, use of static forms of authentication alone such as simple password-based authentication (e.g., OTPs) does not take into account additional factors such as where the user is located, what device the user is using, user access frequency, and so on.

Additionally, based on an initial successful authentication, the identity and attributes of the user are usually communicated to the web server, but there is no finer-grained indication of a trust level of the authentication or a risk rating for the user. Nevertheless, such information if available could help the web server make multiple authorization decisions throughout the user's session with the web server, which can enhance security in many cases.

Furthermore, the above-described conventional authentication approaches only provide an indication of the user and his/her trustworthiness at the beginning of the user's session. That is, if a user's session were hijacked or the client device were compromised in mid-session, most web servers would not be aware of it. Accordingly, security could be enhanced if some form of authentication were repeated during the user's session.

Also, as the use of cloud applications and Internet destinations grows and user access become more mobile, having authentication servers within a private enterprise network may provide insufficient performance and functionality. That is, there is a need for an authentication service that is easily accessible to users wherever the users are located.

In contrast to the above-described conventional approaches to authentication, an improved technique involves user authentication which identifies trust categories defining user permissions or trust levels (e.g., Low, Med, and High) to control access to a set of resources. Such an improved technique may employ an authentication service hosted in the Internet (a so-called "cloud"-based service) that is accessible to a web server using a web-based authentication protocol such as the Security Assertions Markup Language (SAML) exchange or a web services API (e.g., SOAP, REST, etc.). Additionally, such an improved technique may employ combinations of various types of user authentication (e.g., standard authentication using a token which supplies one-time use passcodes, adaptive authentication, knowledge-based authentication, combinations thereof, etc.). Moreover, such authentication may involve the web server periodically and/or randomly redirecting the user session back to the authentication service to refresh (or perhaps change) the risk/trust categorization and thus robustly and reliably handle certain types of attacks such as attempted hijacking of the user session. Also, such an authentication service may be made available globally over the Internet, in which case it may be truly central and may be used to widely reduce duplication of authentication services.

One embodiment is directed to a user authentication method performed within an electronic apparatus (e.g., an authentication server connected to the Internet). The user authentication method includes receiving, in response to an access request which requests access to a web application from a user device, an authentication request which includes a set of authentication factors. The method further includes performing, in response to the authentication request, an authentication operation based on the set of authentication factors (e.g., standard authentication, adaptive authentication, knowledge-based authentication, combinations thereof, etc.). An authentication result of the authentication operation identifies a particular trust category among a set of trust categories. Each trust category (or trust level) defines a unique set of user permissions. The method further includes providing the authentication result for use by the web application. The particular trust category identified by the authentication result defines a particular set of user permissions to be imposed by the web application on the user device.

In some arrangements, the trust categories take the form of trust levels such as Low, Med, High which control access to certain resources. For example, depending on the current trust level, the user may be allowed to or prevented from performing certain transactions, accessing certain information, changing certain control settings, combinations thereof, and so on.

Other embodiments are directed to systems, apparatus (e.g., enhanced client devices, augmented web servers, etc.), processing circuits, computer program products, and so on. Some embodiments are directed to various methods, electronic components and circuitry which are involved in such user authentication and continuous assertion of trust levels in network-delivered services.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

FIG. 4 is a user permission diagram which is an alternative to the diagram suitable for use by the electronic system of FIG. 1.

DETAILED DESCRIPTION

Improved techniques involve user authentication which identifies trust categories defining user permissions or user trust levels (e.g., Low, Med, and High) to control access to a set of resources. Such improved techniques may employ authentication services hosted in the Internet (i.e., so-called "cloud"-based services) that are accessible to a web server using a web-based authentication protocol such as the Security Assertions Markup Language (SAML) exchange or a web services API (e.g., SOAP, REST, etc.). Additionally, such techniques may employ combinations of various types of user authentication (e.g., standard authentication using a token which supplies one-time use passcodes, adaptive authentication, knowledge-based authentication, etc.). Moreover, such authentication may involve periodic and/or random redirection by the web server to the authentication service to refresh (or perhaps modify) the risk/trust categorization and thus robustly and reliably handle certain types of attacks such as an attempt to hijack the user session following a successful initial authentication. Also, such authentication services may be made available globally over the Internet.

Figure 1:
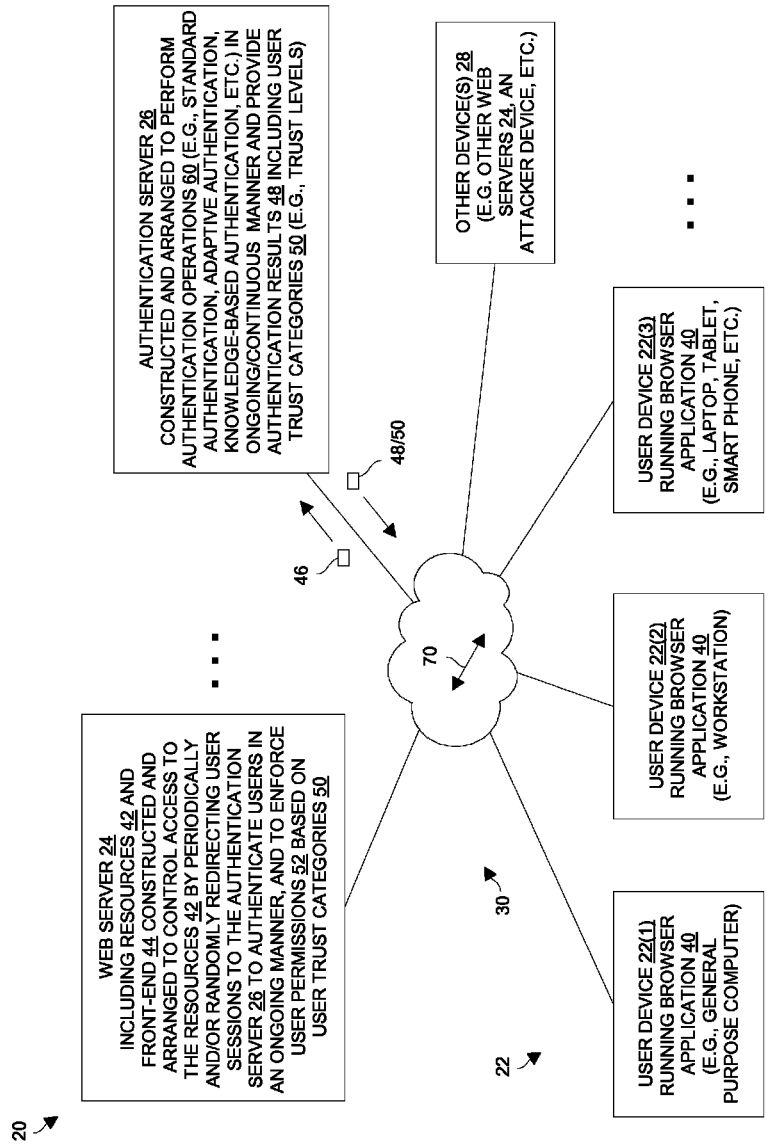
FIG. 1 is a block diagram of an electronic system which utilizes an Internet-accessible service for dynamic authentication and continuous assertion of trust level in identities.

FIG. 1 shows an electronic system 20 which provides an Internet-accessible service for dynamic authentication and continuous assertion of trust level in identities. The electronic system 20 includes user devices 22(1), 22(2), 22(3), . . . (collectively, user devices 22), a web server 24, an authentication server 26, one or more other devices 28, and a communications medium 30.

Each user device 22 is constructed and arranged to perform useful work on behalf of a user. For example, users can run user level applications on the user devices 22 to create and edit documents, to exchange email or other forms of communication, to run specialized applications, to perform transactions, etc. Such activity may involve locally running a browser application 40 to access web resources 42 on the web server 24. Examples of suitable user devices 22 include appropriately provisioned desktop computers or workstations, laptop or notebook computers, tablets, smart phones, and so on.

The web server 24 includes the above-mentioned web resources 42 and a front-end 44 which controls access to the resources 42. In particular, in response to browser commands from the browser applications 40 running on the user devices 22, the front-end 44 establishes user sessions with the user devices 22 and periodically and/or randomly redirects the user sessions to the authentication server 26 to initially authenticate as well as re-authenticate the users of the user devices 22. During such a redirection event, the authentication server 26 (i) receives a new authentication request 46 to authenticate a user of user device 22, (ii) performs an authentication operation, and (iii) outputs an authentication result 48 identifying a current trust category 50 for the user session. The web server 24 receives the authentication result 48 and enforces a set of user permissions 52 based on the current trust category 50 identified by the authentication result 48.

For example, in the context of a file server, a particular trust category 50 may allow a user to access certain files while denying access to other files. As another example, in the context of an online store, a particular trust category 50 may allow a user to shop certain online departments or make purchases under a certain dollar amount. As another example, in the context of an online bank or brokerage, a particular trust category 50 may allow a user to view certain confidential data or transact business under a certain dollar amount, and so on. In some arrangements, the trust category 50 takes the form of a trust level identifier which identifies a particular level of trust which falls along a point within a trust level range (e.g., Low, Med, and High). In other arrangements, such a trust level identifier precisely defines a set of user permissions 52.

The authentication server 26 is constructed and arranged to perform authentication operations 60 in response to authentication requests 46 to authenticate users. As mentioned above, each authentication operation 60 outputs an authentication result 48 having a current trust category 50 which defines a set of user permissions 52 to be imposed by the web server 24 on a particular user. In some arrangements, the authentication operation 60 involves standard authentication, e.g., a comparison of a current one-time use passcode (OTP) from the user to an expected OTP. In some arrangements, the authentication operation 60 performs adaptive authentication based on a current risk posture of the user (e.g., geo-location, access frequency, etc.). In some arrangements, the authentication operation 60 performs knowledge-based authentication (KBA) by challenging the user to respond to a question that the user should be able to correctly answer, and so on.

The communications medium 30 connects the various components of the electronic system 20 together to enable these components to exchange electronic signals 70 (e.g., see the double arrow 70). At least a portion of the communications medium 30 is illustrated as a cloud to indicate that the communications medium 30 is capable of having a variety of different topologies including backbone, hub-and-spoke, loop, irregular, combinations thereof, and so on. Along these lines, the communications medium 30 may include copper-based data communications devices and cabling, fiber optic devices and cabling, wireless devices, combinations thereof, etc.

It should be understood that the electronic environment 20 may include additional devices 28 such as other web servers 24 which may or may not be similarly supported by the authentication server 26. Furthermore, the electronic environment 20 may include a computer belonging to a possible attacker (e.g., a fraudster, a session hijacker, etc.).

During operation, a user of a user device 22 initiates a user session with the web server 24. In particular, the user provides the web server 24 with a user identifying information (e.g., a username or user number, a PIN, a password, combinations thereof, etc.) via an initial exchange of web-based messages.

In response, the web server 24 redirects the user session to the authentication server 26. In some arrangements, the web server 24 causes an authentication request 46 to be sent from the user device 22 to the authentication server 26. In other arrangements, the web server 24 sends an authentication request 46 to the authentication server 26 directly or indirectly through the user device 22.

When the authentication server 26 receives the authentication request 46, the authentication server 26 performs an authentication operation 60, and outputs an authentication result 48 having a current trust category 50 based on authentication factors of the authentication request 46. Such authentication factors may include the user identifying information initially provided by the user, as well as additional information such as the time of day, posture data collected from the user device 22, and so on.

The web server 24 receives the authentication result 48 and provides the user of the user device 22 with access which is based on the current trust category 50 of the authentication result 48. In contrast to conventional authentication approaches, the web server 24 is able to specifically tailor user access permissions based on the current trust category 50, e.g., allow only low security operations when the current trust category 50 indicates relatively high risk, allow higher security operations when the current trust category 50 indicates relatively low risk, etc. In some arrangements, the authentication server 26 sends the authentication result 48 directly to the web server 24. In other arrangements, the authentication server 26 sends the authentication result 48 to the web server 24 directly or indirectly through the user device 22.

At this point, the user is able to access various resources 42 of the web server 24 if authentication is successful. Additionally, to maintain continuous trust assertion, the web server 24 periodically and/or randomly redirects the user to authentication server 26 to re-authenticate. Since the trust category 50 may change over time from authentication operation 60 to authentication operation, it should be understood that the web server 24, in turn, is able to modify its imposed level of security on the user by allowing or denying security operations based on an updated trust category 50. In some arrangements, such redirection is transparent to the user and the amount of time between authentication attempts varies to prevent predictability of the authentication operations 60. In some arrangements, the various components of the electronic system 20 utilize a web-based authentication protocol such as SAML, or a web services API such as SOAP or REST.

For example, in the context of SAML, the front-end 44 of the web server 24 may operate, among other things, as a SAML service provider. Additionally, the user devices 22 may operate, among other things, as user agents. Furthermore, the authentication server 26 may operate, among other things, as a SAML identity provider. Further details will now be provided with reference to FIG. 2.

Figure 2:
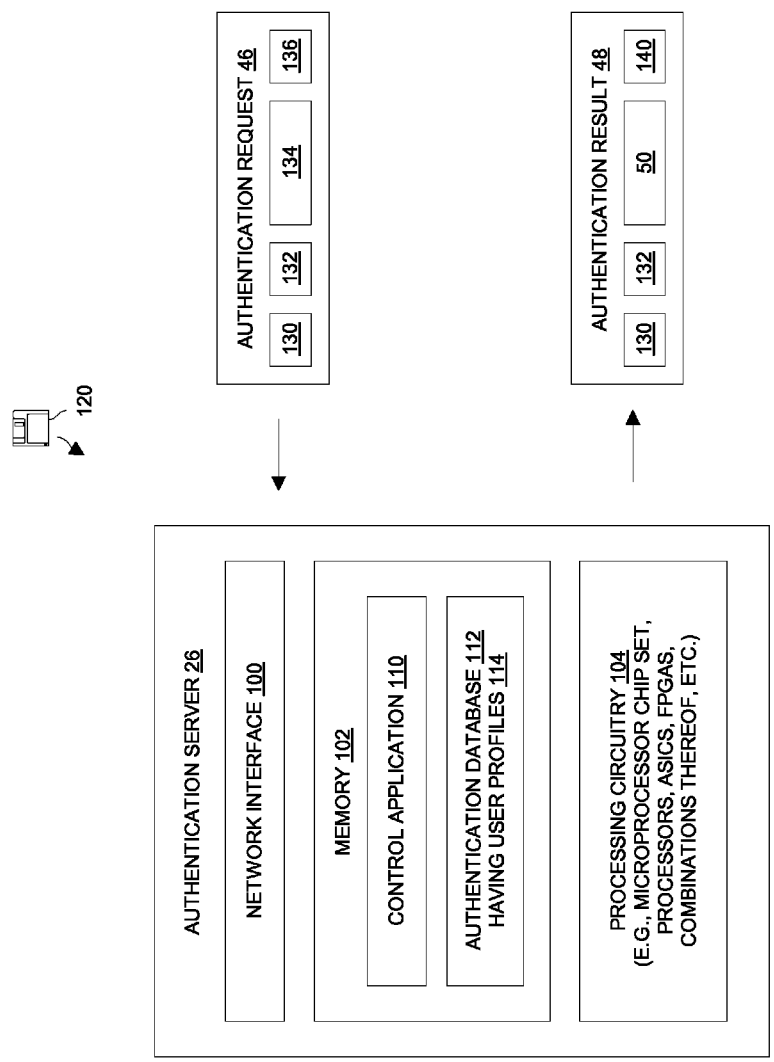
FIG. 2 is a block diagram of an authentication server of the electronic system of FIG. 1.

FIG. 2 shows particular details of the authentication server 26. The authentication server 26 includes a network interface 100, memory 102 and processing circuitry 104. The memory 102 stores a control application 110 and an authentication database 112 having user profiles 114.

The network interface 100 is constructed and arranged to connect the authentication server 26 to the communications medium 30. Accordingly, the network interface enables the authentication server 26 to communicate with the other components of the electronic environment 20.

The memory 102 is constructed and arranged to hold a variety of software constructs to facilitate operation of the authentication server 26. In particular, the control application 110 directs the operation of the processing circuitry 104. Additionally, the authentication database 112 includes user profiles 114 providing information used during authentication of the users.

The processing circuitry 104 is constructed and arranged to perform the authentication operations 60. It should be understood that the processing circuitry 104 can be implemented in a variety of ways including via one or more processors running specialized software, application specific ICs (ASICs), field programmable gate arrays (FPGAs) and associated programs, discrete components, analog circuits, other hardware circuitry, combinations thereof, and so on. In the context of one or more processors running specialized software, a computer program product 120 is capable of delivering all or portions of the software to the authentication server 26. The computer program product 120 has a non-transitory (or non-volatile) computer readable medium which stores a set of instructions which controls one or more operations of the authentication server 26. Examples of suitable computer readable storage media include tangible articles of manufacture and apparatus which store instructions in a non-volatile manner such as CD-ROM, flash memory, disk memory, tape memory, and the like.

During operation, the authentication server 26 receives an authentication request 46 (FIG. 2). This authentication request 46 includes a user identifier 130 which identifies a particular user among multiple users, a web server identifier 132 which identifies a particular web server 24 among multiple web servers 24, a set of authentication factors 134 (i.e., one or more authentication factors), and additional information 136 (e.g., source and destination network addresses, an authentication request number to uniquely identify the authentication request 46, etc.). Upon receipt of the authentication request 46, the processing circuitry 104 of the authentication server 26 retrieves a particular user profile 114 from the authentication database 112 based on the user identifier 130 and the web server identifier 132. The particular user profile 114 includes information regarding the user such as how the processing circuitry 104 should authenticate the user.

For example, suppose that the user profile 114 indicates that the processing circuitry 104 should perform a combination of standard authentication and adaptive authentication (AA) to authenticate the user. Along these lines, the current set of authentication factors 134 of the authentication request 46 may include a one-time user passcode (OTP) and AA factors (e.g., current time of day, geo-location, device type, posture and fingerprint data of the user device 22, etc.). To authentication the user, the processing circuitry 104 evaluates the current set of authentication factors 134 against the user profile 114 to determine whether the user is legitimate (e.g., compares a current OTP to an expected OTP derived from a stored seed, compares current AA factors to previous AA factors, etc.).

Upon completion of the authentication operation 60, the processing circuitry 104 outputs an authentication result 48 which includes the user identifier 140 identifying the particular user, the web server identifier 132 identifying the particular web server 24, a current trust category 50 which identifies a current set of user permissions which are based on the evaluation of the current set of authentication factors 134, and additional information 140 (e.g., source and destination network addresses, the earlier-provided authentication request number to identify the authentication request 46, an amount of time that the current trust category 50 is valid, etc.).

When the web server 24 receives the authentication result 48 (indirectly through the user device 22 or perhaps even directly from the authentication server 26), the web server 24 tailors its operation based on the current trust category 50 of the authentication result 48.

It should be understood that the authentication server 26 is capable of performing a variety of different types of authentication operations 60 to determine whether the user is legitimate. Moreover, for the same user, the authentication server 26 may perform different types of authentication operations 60 during the course of continuously authenticating the user over multiple redirections (e.g., initially a combination of standard and adaptive authentication, followed by transparent AA, followed by KBA, etc.). Further details will now be provided with reference to FIGS. 3 and 4.

Figure 3:
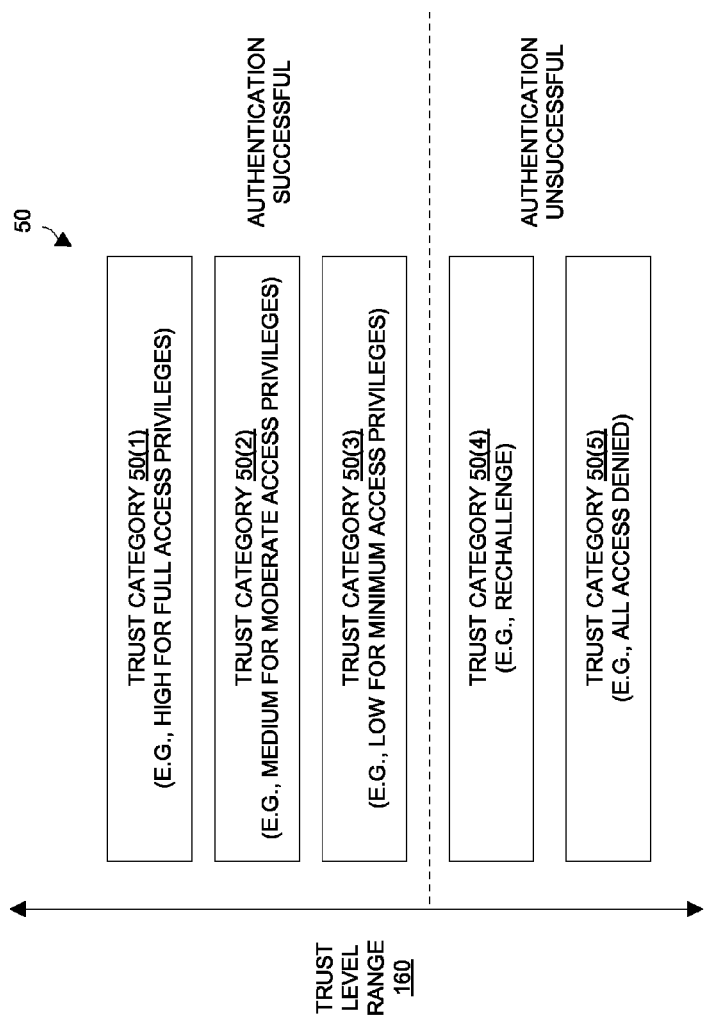
FIG. 3 is a diagram of a trust level range which is suitable for use by the electronic system of FIG. 1.

FIGS. 3 and 4 show different ways in which the trust categories 50 are able to control user permissions on the web server 24. In particular, FIG. 3 shows a trust level range 160 which is formed by the trust categories 50. Alternatively, FIG. 4 shows a user permission diagram which is defined by the trust categories 50.

In connection with FIG. 3, the various trust categories 50 operate as trust level identifiers which define points (i.e., levels of trust) along a trust level range 160. The trust categories 50 above the dashed horizontal line indicate successful authentication while the trust categories 50 below the dashed horizontal line indicate unsuccessful authentication. In particular, the authentication server 26 may map algorithmic results of the authentication operations 60 to the various trust categories 50 in FIG. 3.

As shown in FIG. 3 and by way of example only, the trust category 50(1) indicates the highest level of trust in the trust level range and thus may direct the web server 24 to provide full access privileges to the user (e.g., the user may perform any transaction on the web server 24). The trust category 50(2) indicates the next highest level of trust in the trust level range and thus may direct the web server 24 to provide moderate access privileges to the user. The trust category 50(3) indicates the lowest level of trust in the trust level range and thus may direct the web server 24 to provide minimal access privileges to the user. The trust category 50(4) indicates unsuccessful authentication directing the web server 24 not to provide access to the user but to immediately re-challenge the user (e.g., redirect the user in an attempt to re-authenticate the user). The trust category 50(5) indicates unsuccessful authentication directing the web server 24 not to provide access to the user and perhaps to begin a remedial operation (e.g., attempt to collect additional information from the user device, provide an alert to the web server administrator, etc.). Accordingly, each trust category 50 uniquely identifies a set of privileges or user permissions which are then imposed by the web server 24.

As an alternative to the schema illustrated in FIG. 3, FIG. 4 shows a mapping of various trust categories 50 to various access privileges or user permissions 180 imposed by the web server 24. Again, each trust category 50 uniquely identifies a specific set of privileges. Such privileges may be suitable for an online store, a banking or financial institution, a cloud storage or similar resource provider, and so on.

By way of example only, the trust category 50(1) permits the user to read and write data on the web server 24 and to perform transactions of any amount, but prevents the user from changing user settings. The trust category 50(2) is similar to the trust category 50(1) but prevents the user from writing data and limits the transactions to amounts under $100. The trust category 50(3) prevents reading and writing, permits transactions of any amount, and prevents the user from changing the user settings, and so on. Further details will now be provided with reference to FIG. 5.

Figure 5:
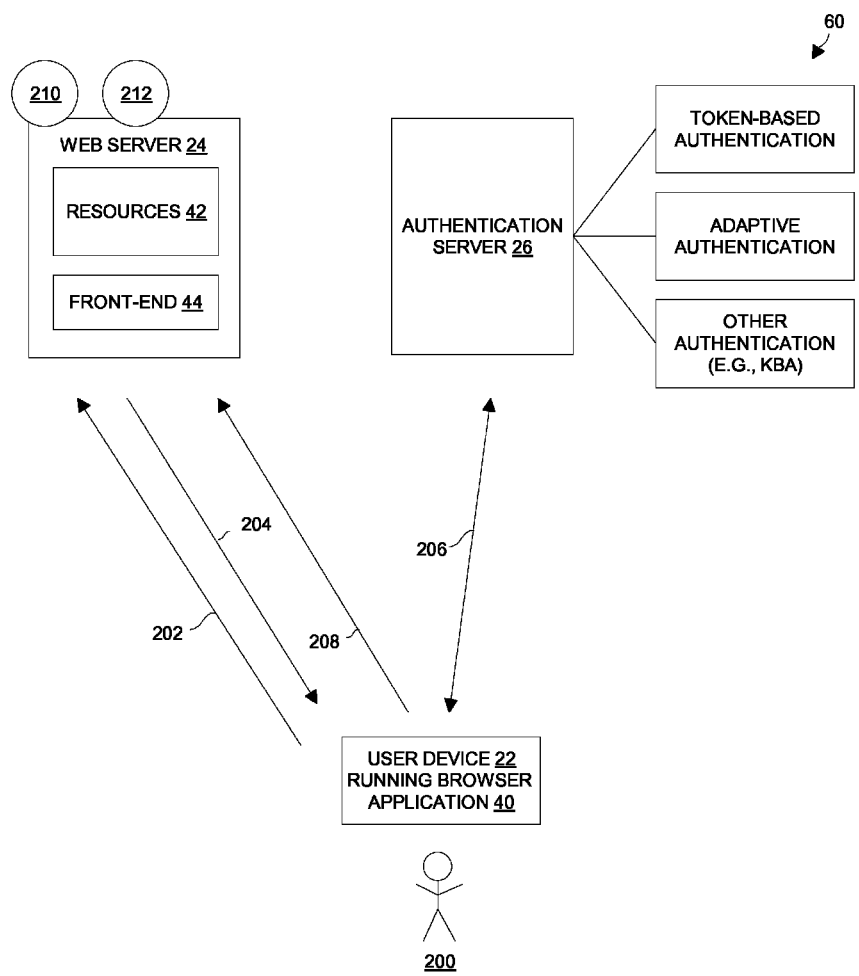
FIG. 5 is a diagram illustrating particular activities that occur during operation of the electronic system.

FIG. 5 shows a sequence of activities that occur during operation of the electronic system 20. The various participating components include a user device 22 controlled by a user 200, the web server 24, and the authentication server 26 (also see FIGS. 1 and 2).

To begin a user session, the user 200 directs the web browser application 40 of the user device 22 to send an initial web request 202 to the web server 24. The web browser application 40 may be in form of a standard browser which simply requests a web page, or a specialized graphical user interface (GUI) particularly designed for an enhanced exchange of information with the web server 24.

Upon receipt of the initial web request 202, the web server 24 does not immediately provide access to the resources 42. Rather, the front-end 44 of the web server 24 delivers a web response 204 back to the user device 22 which redirects the user device 22 to the authentication server 26. This operation is illustrated by arrow 204.

In response to redirection, the user device 22 and the authentication server 26 communicate with each other to authenticate the user 200, as illustrated by the arrow 206. In particular, the authentication server 26 receives an authentication request 46 which includes, among other things, a set of authentication factors (also see FIGS. 1 and 2). The authentication server 26 then performs an authentication operation based on the set of authentication factors and returns an authentication response 48 having a current trust category 50 (FIGS. 1 and 2). As illustrated in FIG. 5, the authentication operation includes one or more types of authentication such as token-based authentication, adaptive authentication, knowledge-based authentication, and so on.

Upon receipt of the authentication response 48, the user device 22 redirects back to web server 24 while conveying the authentication response 48 to the web server 24 as illustrated by arrow 208. The authentication response 48 includes the current trust category 50.

At this point, the web server 24 makes authorization decisions based on the authentication response 48. In particular, as shown by the arrow 210, the front-end 44 of the web server 24 controls access to the resources 42 based on the current trust category 50 (FIGS. 1 and 2).

Furthermore, as shown by the arrow 212, the front-end 44 periodically and/or randomly redirects the user device 22 back to the authentication server 26 to refresh the trust category 50 (i.e., to repeat the activities represented by arrows 204, 206 and 208). Accordingly, the web server 24 protects against attacks such as malware infections and hijacking of user sessions following initial successful authentication.

It should be understood that the amount of time between re-authentication exchanges may vary to prevent an attacker from predicting when the authentication activities occur. Moreover, detected changes in risk/device posture may also trigger re-authentication exchanges (e.g., a change in typing speed).

It should be further understood that the periodic and/or random redirection of the user session from the web server 24 back to the authentication server 26 can be, in some instances, transparent to the user. For example, the authentication server 26 can evaluate adaptive authentication factors from the user device 22 over time (i.e., over multiple authentication operations 60) and adjust the current trust category 50 dynamically. Such operation makes the user experience less burdensome but nevertheless enables continuous assertion of trust levels.

As mentioned earlier, the various components of the electronic system 20 may employ a web-based authentication protocol such as SAML or a web services API such as SOAP or REST. Alternatively, a variety of independent and/or custom mechanisms are used to ensure that the authentication response 48 has not been tampered with by the user device 22 (e.g., encryption, use of digital certificates, etc.). Further details will now be provided with reference to FIG. 6.

Figure 6:
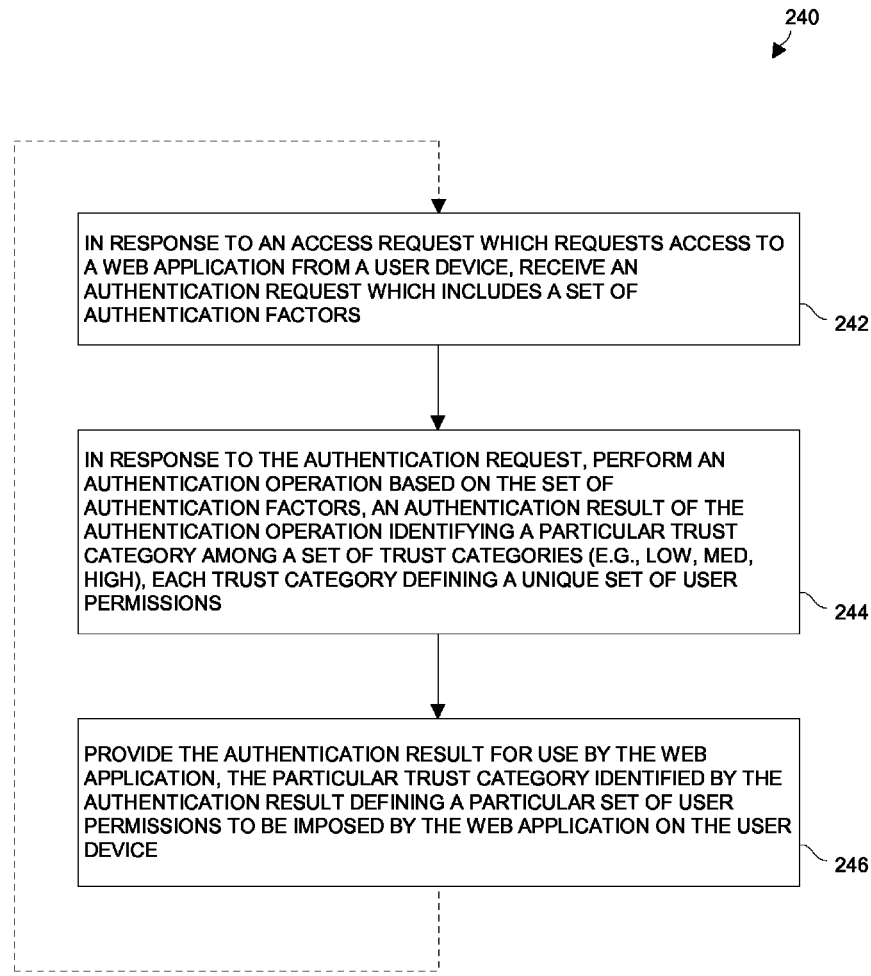
FIG. 6 is a flowchart of a procedure which is performed by the electronic system of FIG. 1.

FIG. 6 shows a flowchart of a procedure 240 which is performed by the authentication server 26 of the electronic system 20. In step 242, the authentication server 26 receives, in response to an access request (arrow 202 in FIG. 5) which requests access to a web application (i.e., the combination of resources 42 and the front-end 44) from a user device 22, an authentication request 46 which includes a set of authentication factors.

In step 244, the authentication server 26 performs, in response to the authentication request 46, an authentication operation 60 based on the set of authentication factors. The authentication result 48 of the authentication operation 60 identifies a particular trust category 50 among a set of trust categories. Each trust category 50 of the set defines a unique set of user permissions or privileges (also see FIGS. 3 and 4).

In step 206, the authentication server 26 provides the authentication result 46 for use by the web application. Along these lines, the particular trust category 50 identified by the authentication result 48 defines a particular set of user permissions to be imposed by the web application on the user device 22 (FIGS. 3 and 4).

The dashed line indicates that the procedure 240 is capable of being repeated in an ongoing maner for continuous assertion of trust level identities. That is, the web application redirects the user session from time to time to re-authenticate the user. Accordingly, the user is protected against attacks in mid-session, e.g., hijacking of the user session.

As described above, an improved technique involves user authentication which identifies trust categories defining user permissions or trust levels (e.g., Low, Med, and High) to control access to a set of resources. Such an improved technique may employ an authentication service hosted in the Internet (a so-called "cloud"-based service) that is accessible to a web server using a web-based authentication protocol such as SAML exchange or a web services API such as SOAP or REST. Additionally, such an improved technique may employ combinations of various types of user authentication (e.g., standard authentication using a token which supplies one-time use passcodes, adaptive authentication, knowledge-based authentication, combinations thereof, etc.). Moreover, such authentication may involve the web server periodically and/or randomly redirecting the user session back to the authentication service to refresh (or perhaps change) the risk/trust categorization and thus robustly and reliably handle certain types of attacks such as attempted hijacking of the user session. Also, such an authentication service may be made available globally over the Internet, in which case it may be truly central and may be used to widely reduce duplication of authentication services.

While various embodiments of the present disclosure have been particularly shown and described, it will be understood by those skilled in the art that various changes in form and details may be made therein without departing from the spirit and scope of the present disclosure as defined by the appended claims.

One should appreciate that the above-described improved techniques enable robust and reliable user authentication in network-delivered information services, such as web applications that deliver information services over private or public networks. In particular, web applications may need to authenticate users in order to provide services with an acceptable level of security. Unfortunately, in conventional approaches, to avoid unnecessary duplication of functionality at multiple web servers, a centralized authentication service is sometimes used within an enterprise for multiple web applications to rely on. Although this enables the web applications to identify users with some level of confidence, it nonetheless has some deficiencies:

A. The authentication is often static and does not take into account the varying levels of risk involved depending on factors such as where the user is accessing the system from, what device the user is using, a frequency with which the user is accessing the system, etc. A good example of such static authentication is simple password-based authentication.

B. Based on an initial authentication, the identity and attributes of the user are usually communicated to the web application, but there is no finer-grained indication of a trust level of the authentication or a risk rating for the user. Such information if available could help the web application make multiple authorization decisions throughout the user's session with the web application, which can enhance security in many cases.

C. Typical authentication only provides an indication of the user and their trustworthiness at the beginning of the user's session. If a user's session were hijacked or the user device were to be compromised during the session, most web applications would not be aware of it. Security can be enhanced if some form of authentication were repeated during a session.

D. Lastly, as the use of cloud applications and Internet destinations grows and user access become more mobile, having authentication servers within a private enterprise network may provide insufficient performance and functionality. There is a need for an authentication service that is easily accessible to users wherever they are located.

In general, the above shortcomings of the conventional authentication approaches are addressed by an authentication scheme employing an authentication service hosted in the Internet (a so-called "cloud"-based service) that is accessible to web applications using a web-based authentication protocol such as a SAML exchange, or a web services API such as SOAP or REST. Such an authentication scheme preferably has the following functionality and capabilities:

A. The authentication service evaluates a risk posture of any end user requesting access to a web application based on characteristics such as the end user's device fingerprint (unique characteristics of the mobile device, laptop, etc.), geographic location, the user's past and present behavior, and any signs of presence of malware on the user's device. Based on an evaluated level of risk, the authentication service may challenge the user to perform one of many supported authentication methods (e.g., passwords, one time passwords, certificates, secret questions, Kerberos-Active Directory, etc.). This results in a more dynamic authentication of the user.

B. As part of an initial authentication of the user, the authentication service returns a message to the relying web application including not only the information identifying the user but also a risk/trust categorization according to an agreed categorization scheme (e.g., trust level is Low, Med, or High). This trust categorization can be used by the web application throughout the session to control the user's permissions granularly. For example, two users may both be granted access to the web service, but if their trust levels are different then the web service may prevent the less trusted user from performing certain operations that are available to the more trusted user.

C. The relying web application periodically and/or randomly redirects the user session to the authentication service to refresh the risk/trust categorization. This refreshing is preferably done on a random basis rather than being event-driven, making it more difficult for the process to be subverted or spoofed in some manner. During each refresh operation, the authentication service reevaluates the risk posture based on current values of the risk-related characteristics of the user or session. If the characteristics have not changed, then the user session may simply be redirected back to the web application in a transparent manner, leaving the user unaware of the refresh operation (i.e., the redirections occur automatically at a level that does not involve user interaction). If any characteristics have changed, then appropriate action can be taken in the interest of maintaining security. For example, the user could be presented with an authentication challenge. This refresh function may enable a hijacked session to be detected, because some characteristic such as the device fingerprint, the geographic location or other factor would have changed since the initial authentication.

D. In some embodiments the authentication service may be available globally over the Internet, in which case it is truly central and can be used widely reducing duplication of authentication services.

The risk/trust categorization scheme may be organized in any suitable effective manner, and in some embodiments it may have some level of configurability. Some existing authentication systems generate a numerical risk "score", which may be used to provide the risk/trust categorization back to the web application. For example, the risk score itself may be returned, in which case the web application includes knowledge of the overall range of the score, the meaning of scores of different values, and threshold values (possibly configured) defining ranges of acceptable scores for initial and continued user access to the web service. Alternatively, the authentication service may translate the risk score into a categorization scheme such as the above-mentioned scheme of indicating a trust level as Low, Medium or High.

As described above and with reference to the figures, the authentication service is represented by components for a Smart Authentication Service, Token-based Authentication, Adaptive Authentication, and Other Authentication (see FIG. 5). The Smart Authentication Service serves as a well-known front-end or access point for authentication services, which are actually provided by the other components in "back-end" roles. In the illustrated scheme, the user device is involved in the redirections used for initial and refreshed authentications. In an alternative embodiment, there may be a direct session between the web service and the Smart Authentication Service, in which case the web service can directly initiate authentications without employing redirection. In this kind of system, the web service may include an agent component specifically tailored to provide such a direct interface to the Smart Authentication Service.

With reference to FIG. 5, the phases of authentication-related operation as follows:
1. Initial user access to web service
2. Web service initiates redirect to authentication service
3. Initial risk-based authentication of user by authentication service
4. Redirect back to web application with risk/trust assertion from authentication service
5. Web application uses risk/trust assertion to make authorization decisions during session
6. User periodically and/or randomly redirected to authentication service to refresh risk/trust category As noted above, an available authentication protocol such as SAML may be employed, with extensions to support the assertion of a trust level as described herein. SAML has beneficial aspects including ease of use and wide existing adoption. However, the authentication scheme herein is in no way dependent on or limited to use with SAML or any other specific communications mechanism. Important aspects of the communications include support for risk-based authentication, the ability of the authentication service to convey a risk/trust categorization to the web service, and support for refreshing recently made authentications. Optional aspects may include support for configurability, such as negotiation of a categorization scheme and/or other operational parameters between a web service and the authentication service.

What is claimed is:

1. A user authentication method performed within an electronic apparatus, the user authentication method comprising:
   in response to an access request which requests access to a web application from a user device, receiving an authentication request which includes a set of authentication factors;
   in response to the authentication request, performing an authentication operation based on the set of authentication factors, an authentication result of the authentication operation identifying a particular trust category among a set of trust categories, each trust category of the set defining a unique set of user permissions; and
   providing the authentication result for use by the web application, the particular trust category identified by the authentication result defining a particular set of user permissions to be imposed by the web application on the user device;
   wherein the set of trust categories includes multiple trust levels forming a trust level range;
   wherein performing the authentication operation includes generating a particular trust level identifier which identifies, as the particular trust category defining the particular set of user permissions to be imposed by the web application on the user device, a particular trust level within the trust level range; and
   wherein the method further comprises:
   receiving another authentication request which includes another set of authentication factors and performing another authentication operation based on the other set of authentication factors, an authentication result of the other authentication operation including a new trust level identifier.

2. A user authentication method as in claim 1 wherein the particular trust level identifier and the new trust level identifier identify the same trust level within the trust level range.

3. A user authentication method as in claim 1 wherein the particular trust level identifier and the new trust level identifier identify different trust levels within the trust level range.

4. A user authentication method as in claim 1 wherein the web application runs on a web server;
   wherein a browser application runs on the user device; and
   wherein the electronic apparatus is an authentication server which is separate from the web server and the user device.

5. A user authentication method as in claim 4 wherein receiving the authentication request includes:
   obtaining the authentication request from the user device in response to: (i) transmission of the access request from the browser application running on the user device to the web application running on the web server, and (ii)

subsequent redirection of the browser application running on the user device from the web application running on the web server to the authentication server.

6. A user authentication method as in claim 4 wherein providing the authentication result for use by the web application includes:
outputting the authentication result from the authentication server to the browser application running on the user device for conveyance of the authentication result from the browser application to the web application running on the web server.

7. A user authentication method as in claim 1 wherein the electronic apparatus is an authentication server which is constructed and arranged to authenticate multiple users; wherein the authentication request further includes a user identifier which identifies a particular user among the multiple users; and wherein performing the authentication operation in response to the authentication request includes:
based on the user identifier of the authentication request, retrieving a user profile from an authentication database of the authentication server, the authentication database storing multiple user profiles corresponding to the multiple users, and
evaluating the set of authentication factors against the user profile to generate the authentication result.

8. A user authentication method as in claim 7 wherein the set of authentication factors includes a current one-time use passcode; and wherein evaluating the set of authentication factors against the user profile to generate the authentication result includes:
comparing the current one-time use passcode to an expected one-time use passcode based on the user profile, and
selecting the particular trust category from the set of trust categories based on a result of comparing the current one-time use passcode to the expected one-time use passcode.

9. A user authentication method as in claim 7 wherein the set of authentication factors of the authentication request includes a current set of risk-based factors; and wherein evaluating the set of authentication factors against the user profile to generate the authentication result includes:
comparing the current set of risk-based factors to an expected set of risk-based factors based on the user profile, and
based on a result of comparing the current set of risk-based factors to the expected set of risk-based factors, generating a numerical risk score which provides a measure of the level of risk
selecting the particular trust category from the set of trust categories based on the numerical risk score.

10. A user authentication method as in claim 7 wherein the set of authentication factors includes a current answer to a knowledge-based authentication question; and wherein evaluating the set of authentication factors against the user profile to generate the authentication result includes:
comparing the current answer to the knowledge-based authentication question to an expected answer to the knowledge-based authentication question based on the user profile, and
selecting the particular trust category from the set of trust categories based on a result of comparing the current answer to the expected answer.

11. A user authentication method as in claim 7, further comprising:
providing the authentication result of the other authentication operation for use by the web application, the new trust level identifier of the authentication result of the other authentication operation defining a new set of user permissions to be imposed by the web application on the user device.

12. A user authentication method as in claim 11 wherein receiving the other authentication request includes:
after a controlled amount of time has elapsed between (i) providing the authentication result for use by the web application and (ii) detection of a change between the set of authentication factors and the other set of authentication factors, acquiring the other set of authentication factors to provide ongoing authentication in a manner which re-authenticates the user over a time interval which is unpredictable to the user.

13. An electronic apparatus, comprising:
a network interface;
memory to store a database having a set of trust categories; and
a controller coupled to the network interface and the memory, the controller being constructed and arranged to:
receive, in response to an access request which requests access to a web application from a user device, an authentication request through the network interface, the authentication request including a set of authentication factors,
perform, in response to the authentication request, an authentication operation based on the set of authentication factors, an authentication result of the authentication operation identifying a particular trust category among the set of trust categories of the database, each trust category of the set defining a unique set of user permissions, and
provide, through the network interface, the authentication result for use by the web application, the particular trust category identified by the authentication result defining a particular set of user permissions to be imposed by the web application on the user device;
wherein the set of trust categories includes multiple trust levels forming a trust level range;
wherein the controller, when performing the authentication operation, is constructed and arranged to generate a particular trust level identifier which identifies, as the particular trust category defining the particular set of user permissions to be imposed by the web application on the user device, a particular trust level within the trust level range; and
wherein the controller is further constructed and arranged to:
receive another authentication request which includes another set of authentication factors and performing another authentication operation based on the other set of authentication factors, an authentication result of the other authentication operation including a new trust level identifier.

14. An electronic apparatus as in claim 13 wherein the particular trust level identifier and the new trust level identifier identify the same trust level within the trust level range.

15. An electronic apparatus as in claim 13 wherein the particular trust level identifier and the new trust level identifier identify different trust levels within the trust level range.

16. An electronic apparatus as in claim 13 wherein the web application runs on a web server;
wherein a browser application runs on the user device; and
wherein the electronic apparatus is an authentication server which is separate from the web server and the user device.

17. A computer program product having a non-transitory computer readable medium which stores a set of instructions that, when performed by a computer, cause the computer to carry out a method comprising:
- receiving, in response to an access request which requests access to a web application from a user device, an authentication request which includes a set of authentication factors;
- in response to the authentication request, performing an authentication operation based on the set of authentication factors, an authentication result of the authentication operation identifying a particular trust category among a set of trust categories, each trust category of the set defining a unique set of user permissions; and
- providing the authentication result for use by the web application, the particular trust category identified by the authentication result defining a particular set of user permissions to be imposed by the web application on the user device;
- wherein the set of trust categories includes multiple trust levels forming a trust level range;
- wherein performing the authentication operation includes generating a particular trust level identifier which identifies, as the particular trust category defining the particular set of user permissions to be imposed by the web application on the user device, a particular trust level within the trust level range; and
- wherein the method further comprises:
- receiving another authentication request which includes another set of authentication factors and performing another authentication operation based on the other set of authentication factors, an authentication result of the other authentication operation including a new trust level identifier.

18. A computer program product as in claim 17 wherein the particular trust level identifier and the new trust level identifier identify the same trust level within the trust level range.

19. A computer program product as in claim 17 wherein the particular trust level identifier and the new trust level identifier identify different trust levels within the trust level range.

20. A computer program product as in claim 17 wherein the web application runs on a web server;
- wherein a browser application runs on the user device; and
- wherein the computer is an authentication server which is separate from the web server and the user device.

* * * * *